United States Patent
Hodgson et al.

(10) Patent No.: US 8,931,258 B2
(45) Date of Patent: Jan. 13, 2015

(54) METHOD FOR METERING A REDUCING AGENT, METHOD FOR SETTING UP A CONTROL UNIT FOR A METERING DEVICE AND MOTOR VEHICLE HAVING A METERING DEVICE

(75) Inventors: Jan Hodgson, Troisdorf (DE); Peter Bauer, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 79 days.

(21) Appl. No.: 13/572,861

(22) Filed: Aug. 13, 2012

(65) Prior Publication Data

US 2013/0036724 A1  Feb. 14, 2013

(30) Foreign Application Priority Data

Aug. 12, 2011   (DE) .......................... 10 2011 110 056

(51) Int. Cl.
  *F01N 3/00*   (2006.01)
  *F01N 3/20*   (2006.01)

(52) U.S. Cl.
  CPC ........... *F01N 3/208* (2013.01); *F01N 2610/146* (2013.01); *F01N 2900/1806* (2013.01); *F01N 2900/1821* (2013.01); *Y02T 10/24* (2013.01); *F01N 2610/02* (2013.01)
  USPC .................. 60/286; 60/274; 60/295; 60/301; 60/303

(58) Field of Classification Search
  CPC ....... F01N 3/206; F01N 3/2066; F01N 3/208; F01N 2610/02; F01N 2900/04; F01N 2900/1808; F01N 2900/1814; F01N 2900/1824
  USPC .................... 60/274, 277, 286, 295, 301, 303
  See application file for complete search history.

(56) References Cited

U.S. PATENT DOCUMENTS

| | | | | |
|---|---|---|---|---|
| 7,418,957 B2 * | 9/2008 | Abe | ............................. | 123/697 |
| 7,685,810 B2 * | 3/2010 | Hirata et al. | ..................... | 60/277 |
| 7,866,333 B2 | 1/2011 | Boe et al. | | |
| 7,971,426 B2 * | 7/2011 | Van Nieuwstadt | ............. | 60/277 |
| 8,079,209 B2 * | 12/2011 | Jung | ............................... | 60/277 |
| 8,276,437 B2 * | 10/2012 | Kitazawa | .................. | 73/114.69 |
| 8,534,049 B2 | 9/2013 | Reinhold et al. | | |
| 2003/0033799 A1 | 2/2003 | Scheying | | |
| 2010/0218484 A1 | 9/2010 | Arlt et al. | | |

(Continued)

FOREIGN PATENT DOCUMENTS

| | | |
|---|---|---|
| DE | 10139142 A1 | 2/2003 |
| DE | 102006044080 A1 | 3/2008 |
| DE | 102008001789 A1 | 11/2009 |
| DE | 102009010888 A1 | 9/2010 |

(Continued)

*Primary Examiner* — Binh Q Tran
(74) *Attorney, Agent, or Firm* — Laurence A. Greenberg; Werner H. Stemer; Ralph E. Locher (57) ABSTRACT

A method for metering a reducing agent from a metering device to an exhaust gas treatment device includes initially determining at least one operating parameter of the metering device. An injector pressure at an injector for feeding the reducing agent into the exhaust gas treatment device is then calculated from the at least one operating parameter. Then, an opening time for the injector is calculated, in which at least the injector pressure determined in step b) is used. The injector is then opened for the opening time calculated in step c). A method for setting up or configuring a control unit for a metering device and a motor vehicle having a metering device are also provided.

10 Claims, 3 Drawing Sheets

(56) References Cited

U.S. PATENT DOCUMENTS

2011/0239625 A1 10/2011 Fokkelman et al.
2012/0260632 A1 10/2012 Hodgson et al.
2013/0240040 A1 9/2013 Kleinknecht

FOREIGN PATENT DOCUMENTS

| DE | 102009056181 A1 | 6/2011 |
| WO | 2007071263 A1 | 6/2007 |
| WO | 2010066564 A1 | 6/2010 |

* cited by examiner

METHOD FOR METERING A REDUCING AGENT, METHOD FOR SETTING UP A CONTROL UNIT FOR A METERING DEVICE AND MOTOR VEHICLE HAVING A METERING DEVICE

CROSS-REFERENCE TO RELATED APPLICATION

This application claims the priority, under 35 U.S.C. §119, of German Patent Application DE 10 2011 110 056.7, filed Aug. 12, 2011; the prior application is herewith incorporated by reference in its entirety.

BACKGROUND OF THE INVENTION

Field of the Invention

The invention relates to a method for metering a reducing agent from a metering device to an exhaust gas treatment device for purifying the exhaust gases from an internal combustion engine and, in particular, for purifying the exhaust gases from a mobile internal combustion engine of a motor vehicle. The invention also relates to a method for setting up or configuring a control unit for a metering device and a motor vehicle having a metering device.

Due to stricter emissions limits for pollutants in exhaust gases of (mobile) internal combustion engines, exhaust gas treatment devices in which the exhaust gases are purified by feeding in a reducing agent which enables certain pollutants in the exhaust gas to be selectively reduced, have been increasingly significant in recent times. A method which is implemented particularly frequently in such exhaust gas treatment devices is the method of selective catalytic reduction (SCR). In that method, nitrogen oxide compounds in the exhaust gas are reduced with the aid of a reducing agent. Ammonia is often used as a reducing agent. For reasons of safety, ammonia itself is often not stored directly in a motor vehicle but instead is stored in the form of a precursor solution that can be converted into ammonia within the exhaust gas and/or outside the exhaust gas. A reducing agent precursor solution which is used particularly frequently is an aqueous urea solution. A 32.5% aqueous urea solution for that purpose can be obtained under the trademark AdBlue®. In the text which follows, the term "reducing agent" is used both for the reducing agent itself and for a precursor substance (from which the reducing agent can be formed).

Metering devices are normally used to feed the reducing agent into the exhaust gas treatment device in liquid or gaseous form. Such metering devices generally have an injector. The opening time of the injector is used to determine the amount of reducing agent fed into the exhaust gas treatment device. The amount of reducing agent fed in should correspond as accurately as possible to an amount of reducing agent required in the exhaust gas treatment device. That required amount depends, for example, on the amount of exhaust gas, the exhaust gas temperature and/or the exhaust gas composition.

If a reducing agent precursor solution is fed into an exhaust gas treatment device, effective conversion of the reducing agent precursor solution to the actual reducing agent is also required. That preferably takes place within the exhaust gas treatment device, wherein the reducing agent is fed into the exhaust gas treatment device in liquid form and initially evaporates in the exhaust gas treatment device. For that purpose, it is necessary that the reducing agent be finely and uniformly atomized as it is injected into the exhaust gas treatment device. In the case of the aqueous urea solution, conversion to ammonia can be accomplished with thermal (thermolysis) and/or catalytic (hydrolysis) assistance.

SUMMARY OF THE INVENTION

It is accordingly an object of the invention to provide a method for metering a reducing agent, a method for setting up or configuring a control unit for a metering device and a motor vehicle having a metering device, which overcome the hereinafore-mentioned disadvantages and further mitigate the described technical problems of the heretofore-known methods and vehicles of this general type. In particular, the intention is to disclose a particularly advantageous method for metering reducing agent from a metering device to an exhaust gas treatment device, through which the accuracy and/or uniformity of metering is improved.

With the foregoing and other objects in view there is provided, in accordance with the invention, a method for metering a reducing agent from a metering device to an exhaust gas treatment device. The method comprises at least the following steps:

a) determining at least one operating parameter of the metering device;

b) calculating, from the at least one operating parameter, an injector pressure at an injector for feeding the reducing agent into the exhaust gas treatment device;

c) calculating an opening time for the injector using at least the injector pressure determined in step b); and d) opening the injector for the opening time calculated in step c).

The operating parameter of the metering device determined in step a) can be any desired operating parameter of the metering device. An operating parameter of this kind can also include an operating parameter of an injector for feeding the reducing agent into the exhaust gas treatment device, for example. Such an injector can also be part of the metering device. The operating parameter can be a reducing agent pressure determined within the metering device, for example. It is also possible for the operating parameter to be a pumping capacity of a pump of the metering device. If appropriate, an amount of reducing agent delivered by the metering device can be taken into account as an operating parameter. It is furthermore possible for a temperature of the reducing agent in the metering device to be used. It is also possible for an electric current, an electric voltage and/or an electric power consumption of a delivery pump of the metering unit to be taken into account as operating parameters. It is furthermore possible to take into account a position of a moving pump element, in particular the position of a pump diaphragm, a pump ON time, a pump operating frequency, a pump piston position and/or a speed of motion of a moving pump element as operating parameters. It is also possible for values from a characteristic map to be used for controlling the position of a moving pump element.

A piston pump or a diaphragm pump is used as a pump in metering devices, for example. In the case of piston pumps, a piston is moved up and down. The size of a pump chamber is thereby increased and reduced and reducing agent is drawn into the pump chamber through an intake line and forced out of the pump chamber through a discharge line. The delivery direction of the pump is determined by corresponding valves in the intake line and in the discharge line. In the case of a diaphragm pump, the size of the pump chamber is increased and reduced by a movement of the diaphragm. There are also combined pumps, in which the movement of a moving pump element is transmitted through a transmission medium (e.g. a fluid) to a diaphragm, which then, in turn, increases and reduces the size of the pump chamber. The diaphragm or the moving pump element can be driven by an electromagnetic linear drive, for example. It is also possible for the drive to be provided through a connecting rod or an eccentric, with the motion of a rotary drive thus being converted into a linear motion of the diaphragm or of the moving pump element.

The operating parameters taken into account in step a) can also be determined by characteristic curves relating to the operation of the metering device and, in particular, by characteristic curves relating to the operation of the injector and of a pump of the metering device. These characteristic curves are predetermined and invariable and are stored in a control unit, for example. It is also possible for control parameters from the control of the pump and of the injector to be taken into account as operating parameters.

In accordance with another particularly preferred mode of the method of the invention, at least one opening period and/or at least one closing period of the injector for feeding the reducing agent to an exhaust gas treatment device is used as the operating parameter in step a).

The opening period and the closing period are control periods of the injector. These control periods are dependent on the prevailing conditions at the injector (e.g. pressure, temperature etc). The opening period can also be referred to as the energization period. The closing period can also be referred to as the deenergization period. The opening or energization period indicates the time which elapses before the injector is open after the application of an opening signal (e.g. an opening voltage) to the injector. These control periods (opening period and closing period) must be distinguished from the open time of the injector. The opening time indicates how long the injector is actually open between opening and closure. The closing or deenergization period indicates the time which elapses before the injector is closed after the application of a closing signal (e.g. the removal of an opening voltage) to the injector. The opening period and the closing period of the injector affect the point of time (instant) at which the injector is completely open. Taking into account the opening period makes it possible to determine the open time of the injector at which the injector is actually open in a particularly accurate manner. The opening period and the closing period depend decisively, in particular, on the temperature of the injector and/or on the pressure prevailing at the injector.

It is furthermore possible to take into account the parameters of a pressure controller, through which the pressure of the reducing agent in the metering device is controlled. In order to control the pressure, the pressure controller can control the pump, a return valve, through which reducing agent can return to the tank, and/or the injector. The pressure controller can control the pressure with a differential component, a proportional component and an integral component. A separate pressure control parameter can be used for each of these components ($K_D$ for the differential component, $K_P$ for the proportional component and $K_I$ for the integral component). The pressure control parameters are often already fixed by a control unit in accordance with the pressure. It is particularly advantageous to make additional use of these parameters for the method according to the invention.

It is furthermore possible to use the pressure-dependent and temperature-dependent properties of a line which connects the injector to the pump and to the other components of the metering device, as operating parameters.

In some applications, it may be sufficient if just one (single) operating parameter of the metering device is determined or taken into account. As a rule, however, taking into account a plurality or even, in a very specific embodiment, all of the operating parameters mentioned above, is preferred.

In calculating the injector pressure in step b), the operating parameters determined in step a) are combined in a predetermined manner (calculation rule). Such a calculation rule can be implemented in a control unit for the method according to the invention, for example. This control unit can also be an engine controller of a motor vehicle or an engine controller of an internal combustion engine of a motor vehicle, for example. The calculation rule used in step b) is preferably constructed in the manner of a control model, in which the at least one operating parameter determined in step a) is processed as an input variable, and the injector pressure is output as an output variable. A control model can be formed of a set or system of differential equations which establish a relationship between the input variable and the output variable and, if appropriate, there is at least one intermediate variable, which reflects a state of the control model between the input variable and the output variable. As a particular advantage of the method according to the invention, it is possible for the intermediate variables that represent a state of the model to be made available also for other uses by the respective driver components of the control unit, if appropriate.

In calculating the opening time for the injector in step c), the injector pressure determined in step b) is used. The amount of reducing agent fed in by the injector depends substantially on the opening time of the injector and the reducing agent pressure prevailing at the injector (injector pressure). In the open state, the injector represents a flow constriction, through which the reducing agent flows from the metering device to the exhaust gas treatment device. The amount of reducing agent flowing through such a constriction depends heavily on the prevailing injector pressure. As a rule, the amount of reducing agent flowing through the injector is proportional to the injector pressure. For this reason, there is a highly negative effect if the opening time of the injector is not matched to the prevailing injector pressure.

In step d), the injector is normally opened through the use of a magnetic coil. An injector generally has a moving armature, which can be opened by a magnetic coil in the injector.

This means, in other words, that no information on the pressure at the injector is obtained directly (e.g. through the use of a sensor at that location) but that this (local) injector pressure is determined from other operating parameters. As has been established, considerable temperature fluctuations occur directly at the injector because the injector is disposed in the immediate vicinity of the exhaust gas treatment device. The temperature of the exhaust gas treatment device fluctuates greatly due to varying operating states of the internal combustion engine. As a rule, the temperature represents a significant ("disruptive") disturbing influence on the accuracy of pressure measurement of a pressure sensor at the injector. For this reason, it is advantageous not to measure the pressure itself directly at the injector but to determine it by way of a calculation from other operating parameters of the metering device.

Moreover, a large number of parameters which can be used without extra construction effort as operating parameters within the context of the method according to the invention are in any case often available in a metering device.

As already explained above, there is generally a line between the injector and the pump connecting the pump and the other components to the injector, together with the other components of the metering device. This line may have the effect that the pressure in the vicinity of the pump and the pressure at the injector differ from one another. However, it is nevertheless possible, through the use of the method according to the invention, to determine the pressure at the injector precisely. Indeed, the determination of the pressure at the injector through the use of the method according to the invention is often more accurate than through the use of a pressure sensor directly at the injector because the disturbing influences described above acting on a pressure sensor directly at the injector are avoided.

In accordance with a further particularly advantageous mode of the method of the invention, an opening instant and a closing instant are additionally calculated in step c), and the injector is opened at the calculated opening instant and closed at the calculated closing instant in step d).

In accordance with an added particularly advantageous mode of the method of the invention, the opening instant and the closing instant are specified in such a way that no pressure fluctuation initiated by the pump reaches the injector during an opening time between the opening instant and the closing instant. Preferably, pressure fluctuations initiated by the pump only reach the injector outside the opening time, between a closing instant and the following opening instant of a subsequent opening operation.

The injector pressure is often subject to regular or irregular fluctuations. These fluctuations may be initiated by the pump for delivering the reducing agent to the metering device and are often unavoidable, but they can be predicted with the method according to the invention. The operating parameters determined in step a) only take effect on the pressure at the injector after a time delay. If the method according to the invention is carried out sufficiently quickly, the pressure at the injector is thus known at a point in time lying in the future, even before it occurs at the injector. This can be advantageous especially for a particularly advantageous spray pattern of the reducing agent (distribution of the reducing agent after leaving the injector) into the exhaust gas treatment device. The spray pattern of an injector depends on the prevailing injector pressure. The reducing agent can be fed in precisely when there is a particular injector pressure. In order to ensure a particular injector pressure at the injector despite the pressure fluctuations, it is advantageous to use the calculated injector pressure also to determine an opening instant for the injector, at which the desired injector pressure is present. It is then possible to ensure that pressure fluctuations during metering or during the open time in which the injector is open are avoided. With such preventive avoidance of pressure fluctuations during metering, it is simultaneously possible to accept relatively large pressure fluctuations at points in time at which there is no metering. In this way, it is possible to reduce the outlay required for accuracy of pressure control in the metering device.

In accordance with an additional advantageous mode of the method of the invention, at least one of the following properties of the metering device is taken into account in step b):
- at least one property of a line leading from the metering device to the injector,
- at least one property of a delivery unit of the metering device,
- at least one property of a pump of the metering device, or
- at least one property of a control unit, which is set up or configured to control the metering device.

These various properties of the metering device which are described herein can be stored as parameters or system constants in the control model used in step b).

Examples of properties of a line of the metering device which may be considered are the length of the line, the volume of the line, the diameter of the line, the flexibility of the line as a function of the prevailing pressure, the prevailing temperature and/or the flow resistance of the line at various reducing agent delivery rates.

Examples of properties of the delivery unit which may be considered are the flow resistance of the delivery unit, the delivery rate of the delivery unit, the volume of the delivery unit, the flexibility of the delivery unit as a function of the pressure, the temperature of the delivery unit and/or any other properties of the delivery unit.

Examples of properties of the pump which may be considered are the volume of the pump, the flow resistance of the pump, the weight of a moving armature of the pump, the damping and spring constant of the armature of the pump, the electrical properties of a driving coil of the pump and/or the available supply voltage of the pump.

Any properties of a control unit may be considered as properties of the control unit, e.g. time delays, signal attenuation, signal gain, feedback and/or changes in signals resulting from analogue to digital conversion and/or digital to analogue conversion.

In accordance with yet another particularly advantageous mode of the method of the invention, an elasticity and a length of the line are taken into account as the property of the metering device.

In accordance with yet a further particularly advantageous mode of the method of the invention, the elasticity of the line taken into account for the method is adapted at regular intervals in order to take into account ageing of the line.

In the case of a line which connects the pump and the injector, it must additionally be taken into account that this line may be subject to ageing. Particularly if the line is a hose made of plastic, it is possible that the properties of the line, in particular flexibility, may change due to environmental factors. The age of the line too may therefore also be taken into account in the context of the method according to the invention.

The ageing behavior of the line may vary, depending on where the line is laid in the motor vehicle. For example, a line which is exposed to weathering in the region of the underfloor of a motor vehicle or which may even be exposed on a regular basis to sunlight and UV radiation ages considerably more quickly than a line which is completely covered, for example. The actual routing of the line through the motor vehicle may also be taken into account as part of taking into account the ageing of the line. For example, account may be taken of the proportion of the line which is laid in a protected manner and of the proportion of the line which is laid in an unprotected manner.

The temperatures and/or delivery rates to which the line has already been exposed may also be taken into account for the ageing of the line.

An adaptation routine can be carried out at regular intervals to adapt the parameters taken into account in step b).

In accordance with yet an added preferred mode of the method of the invention, at least the calculation of the injector pressure in step b) takes place without feedback. The calculation of the injector pressure without feedback in step b) is preferably performed by using a model without feedback. The term "model with feedforward properties" is also used.

In such a model, output parameters of the model are not used as input parameters of the model. Due to the complexity of the relationships represented in the model, feedback may be problematic. A model without feedback that is adjusted by adaptations at regular intervals is computationally simpler and more amenable to calculation. Thus, the following influences in particular can be taken into account more effectively by adaptations in a model without feedback than in a model with feedback:
- temperature influences,
- the routing of the hose,
- the ageing of the metering device,
- voltage fluctuations in the supply voltage of the metering device,
- fluctuating delivery rates in a range of from 0.001 l/h [liters per hour] to 75 l/h [liters-per hour], and
- inaccuracies in the pump and/or the injector, resulting in leaks and drift, for example.

In accordance with yet an additional mode of the method of the invention, at least one of the following further parameters is used in step c) for calculating the opening time:
- the temperature of the reducing agent,
- the viscosity of the reducing agent,
- at least one physical property of the reducing agent,
- at least one chemical property of the reducing agent, or
- a required amount of reducing agent.

In this case, the difference between "properties of the metering device" and "parameters" will first of all be explained. Parameters differ from properties in that they are substantially variable, while properties are fixed predetermined quantities associated with the metering device or are at least subject to less fluctuation than parameters.

The properties described also affect the amount of reducing agent fed in and the spray pattern of the injector. It is therefore advantageous to incorporate these properties in the calculation of the opening time in step c).

It is particularly advantageous to take into account the substantially constant properties of the metering device in step b) in the control model, while the more variable parameters are taken into account in step c). In this way, it is possible to ensure that no variable parameters have to be taken into account in step b). This simplifies the structure of the control model in step b).

In accordance with again another advantageous mode of the method of the invention, at least one of the following parameters is taken into account as a disturbing factor in step b):
- level of reducing agent in the reducing agent tank,
- temperature of the reducing agent,
- density of the reducing agent,
- viscosity of the reducing agent,
- at least one physical property of the reducing agent,
- at least one chemical property of the reducing agent, or
- a required amount of reducing agent.

At least some of these parameters can have an effect similar to that of variations in properties of the metering device. It may therefore be helpful to take into account those parameters as disturbing influences in step b) rather than maintaining the fundamental allocation of properties to step b) and parameters to step c).

In order to minimize the computational effort required for the control model in step b), the parameters may, for example, be taken into account in step b) in such a way that the parameters are only taken into account if they exceed or undershoot predetermined limiting values.

One parameter which should be taken into account, particularly as a disturbing influence, is the viscosity of the reducing agent. When the viscosity of the reducing agent is high, the pressure in the metering device falls particularly sharply. Moreover, pressure fluctuations in the metering device are subject to particularly intensive damping. The viscosity of the reducing agent is at least partially dependent on the temperature of the reducing agent. The viscosity can therefore be determined particularly through the use of the (measured and/or calculated) temperature.

With the objects of the invention in view, there is also provided a method for configuring or setting up a control unit for a metering device for metering a reducing agent into an exhaust gas treatment device. The method comprises at least the following steps:
- a) providing or constructing a metering device for a reducing agent;
- b) separating or breaking down the metering device into individual system components;
- c) determining operative relationships between the individual system components;
- d) developing model descriptions of the individual system components;
- e) generating a system model from individual model descriptions while taking the operative relationships into account; and
- f) configuring or setting up the system model in the control unit.

In this case, the term "system model" is intended to mean, in particular, a control model of the system which reproduces the operative relationships within the metering device. An analytical approach to the development of such a system model is described below: the metering device is broken down or separated theoretically in step b) into individual system components, the control behavior of each of which is determined separately. This can be accomplished by using known properties of the system components. For a predetermined flow velocity (that can be expected in operation), for example, the time taken by the reducing agent to flow through a line can be determined if the length of the line is known. By using the length of the line and the flow velocity through the line, it is therefore possible to determine a delay time of the line as a system property. A pressure prevailing at the start of the line is available at the outlet of the line with a time delay corresponding to this delay time. The individual system components are in operative relationships in the metering device. These operative relationships can also be determined analytically. For example, it is possible to state how a particular movement of the armature of the pump affects the pressure in the pump chamber. The operative relationships can be stated in a particularly advantageous way in the form of differential equations.

By using the operative relationships, the individual system components can be assembled into a complete system model. This takes place in step e).

In particular, the system model can be assembled in two ways. One approach is to form a set of differential equations for each system component. The respective parameters of the differential equations of a system component then characterize the system component. The individual differential equations of the system components can then be combined and thus form the complete system model. According to another approach, it is possible first of all to convert the differential equations of the individual system components into tables in a pre-calculation process. These tables can then be interlinked. As a rule, a control unit can only solve differential equations with a lot of effort. This approach therefore allows the differential equations first of all to be converted individually into tables for each system component in order to reduce the computational effort for step e).

With the objects of the invention in view, there is furthermore provided a method for configuring or setting up a control unit for a metering device for metering a reducing agent into an exhaust gas treatment device. The method comprises at least the following steps:
- a) providing or constructing a metering device for a reducing agent;
- b) supplying the metering device with an input signal;

c) recording an output signal of the metering device on a basis of the input signal;

d) developing a system model establishing a relationship between the input signal and the output signal; and e) configuring or setting up the system model in the control unit.

This is then a description of an experimental approach for determining a suitable system model. A linear behavior of the metering device is preferably taken as a basis in this case. This means, in particular, that the input signal and the output signal of the metering device are related by linear differential equations in the operating range.

One particularly advantageous possibility is for the relationship between the input signal and the output signal to be characterized at least with the aid of a parameter for a system gain and a parameter for a phase shift.

These input signals normally occur repeatedly at regular intervals with a frequency determined by the delivery rate, which is determined in particular by the pulsed delivery of the delivery pump. The gain and the phase shift of the output signal relative to the input signal can be represented as a function of this frequency in a Bode diagram. The properties of a system model can thus be represented in a Bode diagram.

A system model of this kind can be implemented in a control unit. The experimental approach can be carried out without complex theoretical considerations of the metering device.

In a particularly advantageous way of carrying out the method for setting up or configuring a control unit, it is also possible for the analytical approach and the experimental approach for determining a system model to be combined with one another. The metering device can be broken down or separated into individual system components for which individual component models are determined experimentally in each case. Such component models can be a line model, a metering system model and/or a metering device model, a pump model and/or a controller model, for example. The individual models determined in this way can then be combined in an additional step to give a system model, for which purpose an analytical procedure is once again employed. This represents a hybrid analytical and experimental approach to the configuration of a control model.

The delivery rate of a metering device can be influenced not only by the delivery frequency. Often, it is also possible to influence the delivery rate by not operating the pump in full-stroke mode but (at least at times) in partial-stroke mode. It is possible to speak of a change in the delivery rate through a change in the pump stroke. The availability of this possibility depends on the construction of the pump. Many types of pump are suitable for operation in partial stroke mode. If the delivery rate is possible both by changing the delivery frequency and by changing the pump frequency, there is the possibility of deciding which way of changing the delivery rate is to be used.

This decision can be made according to at least one of the following parameters:
 a supply voltage of the pump,
 a supply voltage of the injector,
 a temperature of the pump,
 a temperature of the injector,
 a desired pressure in the metering device,
 an actual pressure in the metering device,
 a deviation between the desired pressure and the actual pressure, or
 a delivery rate.

The steps presented individually in each case for the method according to the invention for metering a reducing agent and for the methods according to the invention for setting up or configuring a control unit can each be applied and transferred to the other methods described. In particular, the methods according to the invention for setting up or configuring a control unit are suitable for setting up or configuring a control unit which is suitable for carrying out the metering method according to the invention.

With the objects of the invention in view, there is concomitantly provided a motor vehicle, comprising an internal combustion engine, an exhaust gas treatment device for purifying exhaust gases from the internal combustion engine, a metering device for metering a reducing agent into the exhaust gas treatment device, and a control unit configured to carry out the method according to the invention for metering reducing agent.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a method for metering a reducing agent, a method for setting up a control unit for a metering device and a motor vehicle having a metering device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
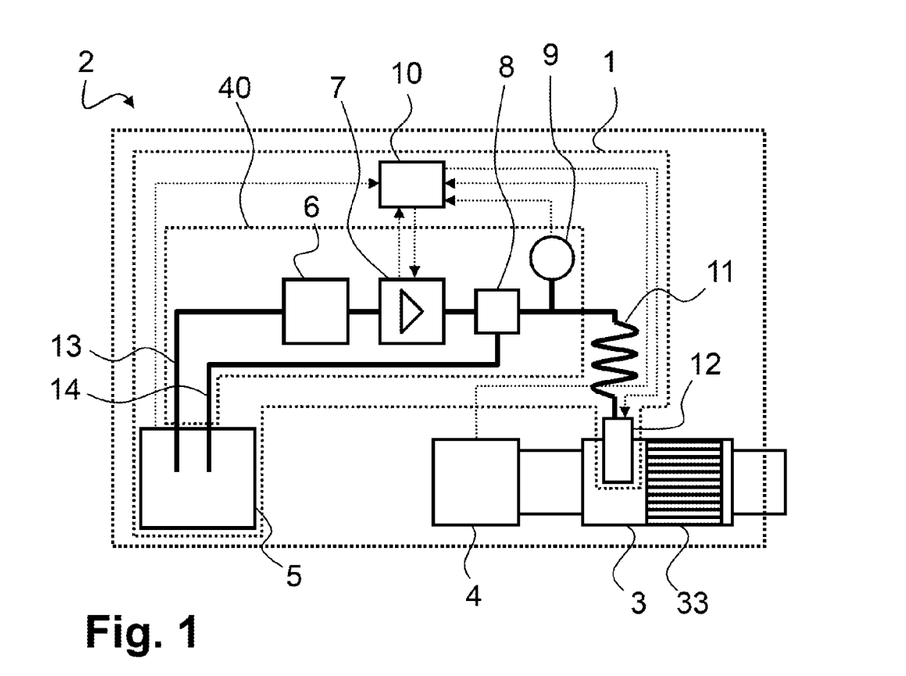
FIG. 1 is a diagrammatic, vertical-sectional view of a motor vehicle having a metering device for carrying out the method according to the invention.

Referring now to the figures of the drawings in detail and first, particularly, to FIG. 1 thereof, there is seen a motor vehicle 2 having an internal combustion engine 4 and an exhaust gas treatment device 3 for purifying exhaust gases from the internal combustion engine 4. Moreover, the motor vehicle 2 has a metering device 1, which feeds (liquid) reducing agent (in particular an aqueous urea solution) in a direction of flow from a reducing agent tank 5, through an injector 12, to the exhaust gas treatment device 3, in particular (directly) upstream of a catalytic converter 33 with an SCR coating. In particular, the metering device 1 includes the reducing agent tank 5, a delivery unit 40, the injector 12 and a line 11 for delivering reducing agent from the delivery unit 40 to the injector 12. A filter 6, a pump 7, a return valve 8 and a sensor 9 are disposed in series in the delivery direction of the reducing agent in a feed line 13 within the delivery unit 40. A return line 14, through which reducing agent can be fed back from the delivery unit 40 into the reducing agent tank 5, branches off at the return valve 8.

Various components of the metering device 1 are furthermore connected to a control unit 10. The active components of the metering device 1, in particular, such as the pump 7 and/or the injector 12, can be monitored and actuated by the control unit 10 as required. The control unit 10 receives information that can be used to control the pump 7 and/or the injector 12 from various components of the metering device 1, such as the pump 7, the injector 12, the reducing agent tank 5 or the sensor 9. Information on the filling level, for example, can be transmitted from the reducing agent tank 5 to the control unit 10. The sensor 9 can determine a reducing agent pressure in the delivery unit 40 and/or a temperature of the reducing agent in the delivery unit 40, for example. A control model, which is provided in the control unit 10, generates information on the reducing agent pressure at the injector 12 using various pieces of information from the delivery unit 40.

Figure 2:
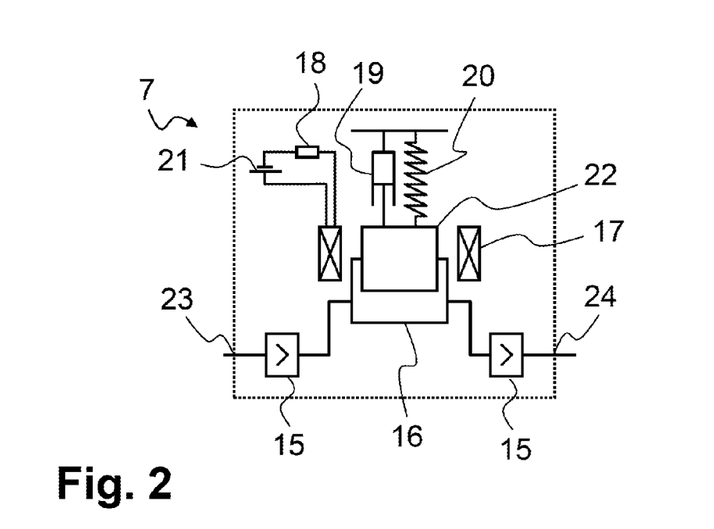
FIG. 2 is a block diagram of a pump for a metering device.

FIG. 2 shows a pump 7 for a metering device for a reducing agent. The pump 7 is intended to show, by way of example, how an analytical method can be used to determine a control model of a system component. The pump 7 has a pump inlet 23 and a pump outlet 24, which are each in fluid connection with a pump cylinder 16. A delivery direction through the pump 7 is determined by valves 15, which are situated at the pump inlet 23 and at the pump outlet 24 and open only in the delivery direction. Delivery in the pump cylinder 16 is accomplished through a movement of a pump piston 22. It is then possible to determine analytically how a particular current pressure on the pump piston 22 affects the pressure at the pump outlet 24 (currently and/or subsequently). The pressure on the pump piston 22 depends substantially on the forces exerted on the pump piston 22. These forces result, on one hand, from the inertia of the pump piston. There is furthermore an electric driving force on the pump piston 22, which is exerted by a coil 17. There is furthermore a damping force, which is caused by damping effects acting on the pump piston 22. Possible examples of such damping effects are the friction of the pump piston 22 and/or the displacement of the reducing agent in the pump cylinder 16 during delivery. In this case, the damping effects are represented overall by a damper 19. Moreover, there are spring forces acting on the pump piston 22, which are represented herein by way of example by a spring 20. Such spring forces result, for example, from the fact that the reducing agent is partially compressible and/or that the force of the pump piston 22 is transmitted to the reducing agent by an elastic transmission fluid. However, such elastic properties can also result from the provision of a spring 20 on the pump piston 22 in order to move the pump piston 22 back into an initial position after carrying out a delivery stroke. The forces on the pump piston 22 are partially dependent on the position or deflection of the pump piston 22. This applies to spring forces, for example. The forces are also partially dependent on the speed of motion of the pump piston 22. This applies to the damping forces, for example. However, the forces are also partially dependent on the acceleration of the pump piston 22. This applies to the inertia, for example. A relationship between the individual forces can therefore be established through the use of differential equations.

It is possible to deduce the pressure in the pump cylinder 16 from the electric force brought about by the coil 17, through the use of such differential equations. The electric force exerted by the coil 17 can, in turn, be determined from a resistance 18 of the coil, from a voltage applied across the coil and from further properties of the coil 17. For this purpose too, there is once again a need for differential equations which represent the corresponding relationships. In this way, it is possible analytically to develop a control model which represents a relationship between a voltage across a voltage source 21 and the pressure at the pump outlet 24.

This procedure can also be applied in a corresponding manner to the entire metering device.

Figure 3:
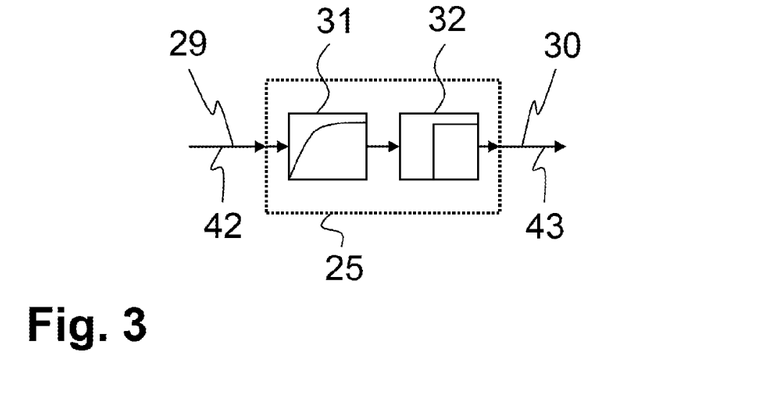
FIG. 3 is a block diagram of a control model of a hose.

FIG. 3 illustrates, by way of example, a control model 25 of a line indicating a relationship between a system pressure 29 in a delivery device as an input signal 42 and an injector pressure 30 at an injector as an output signal 43, for example. In this case, the line model 25, which is illustrated in simplified form, is formed of a delay element 31 and a delay time element 32. The delay element 31 represents the fact that a pressure prevailing at the system pressure 29 must first of all build up in the line, due to an elasticity of the line. The delay time element 32 represents the length of the delivery line. Due to the delay time element, the system pressure 29 does not arrive at the injector until after a time delay, even if it has already built up in the line itself in a manner corresponding to the delay element 31.

Figure 4:
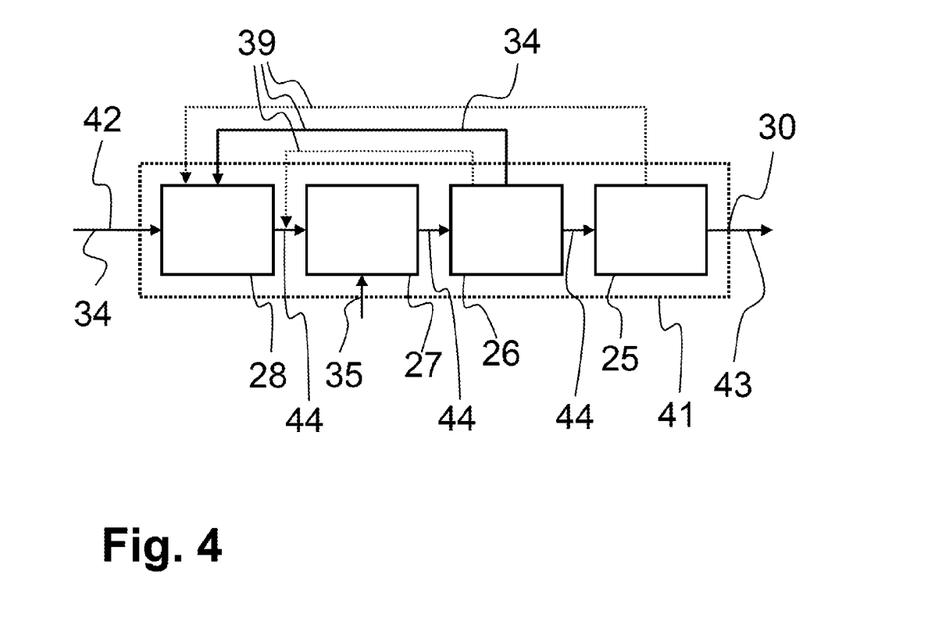
FIG. 4 is a block diagram of a control model of the system.

FIG. 4 illustrates a more complex embodiment of a control model for the metering method. The control model shown in FIG. 4 is a complete system model 41 of a metering device 1. This model is formed of various individual control models, which are related to one another by operative relationships. A controller model 28, a pump model 27, a metering system model 26 and a line model 25 are shown therein in series. An input signal 42 is input into the system model 41 on the left-hand side. One example of an input signal 42 of this kind is an operating parameter 34. An output signal 43, which is the injector pressure 30 to be determined, leaves the system model 41 on the right-hand side. Feedforward links 44 and feedback links 39 are respectively provided between individual control models in the system model 41. Moreover, the system model is influenced at various points by disturbing influences 35.

Figure 5:
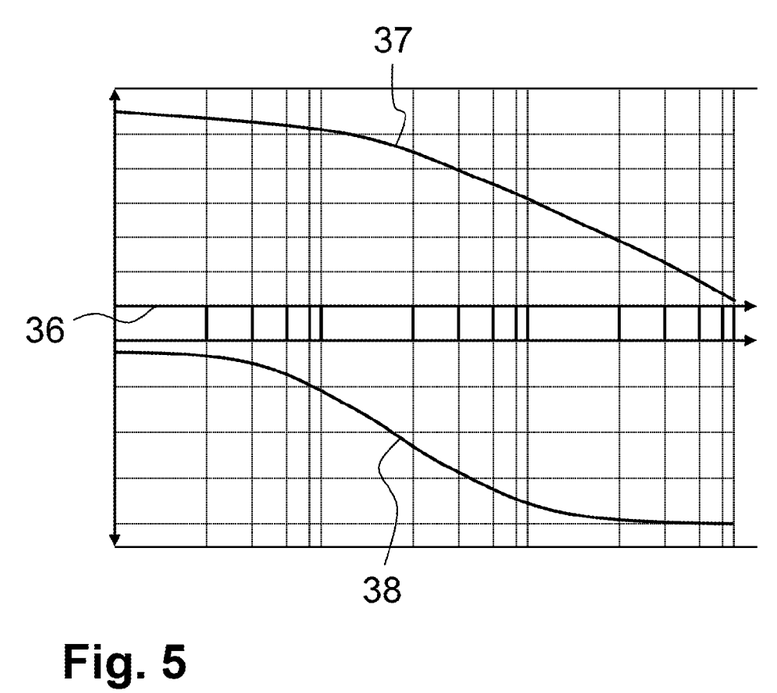
FIG. 5 is a Bode diagram which establishes a relationship between an input signal and an output signal.

FIG. 5 illustrates, by way of example, a Bode diagram, which represents a relationship between an input signal and an output signal. A gain 37 is illustrated at the top along a frequency axis 36. The frequency axis 36 is plotted logarithmically. As the frequency rises, the gain decreases. A phase shift 38 is shown at the bottom, likewise as a function of the frequency. The higher the frequency, the greater the phase shift.

Thus, the technical problems of the prior art which have been described have been successfully mitigated to a greater extent. Moreover, a particularly advantageous method for metering reducing agent from a metering device to an exhaust gas treatment device has been disclosed, through the use of which the accuracy and/or uniformity of metering is improved.

The invention claimed is:

1. A method for metering a reducing agent from a metering device to an exhaust gas treatment device, the metering device having an injector and a delivery unit with a pump and a pressure sensor, the delivery unit and the injector being connected by a line leading from the delivery unit to the injector, the method comprising the following steps:
   a) determining at least one operating parameter of the metering device the at least one parameter being a system pressure in the delivery device determined by the sensor and providing the at least one operating parameter to a control unit;
   b) calculating in the control unit, from the at least one operating parameter, an injector pressure at the injector for feeding the reducing agent into the exhaust gas treatment device while considering at least one of a length of the line, a volume of the line, a diameter of the line, or a flexibility of the line;

c) calculating, in the control unit, an opening time and an opening instant for the injector using at least the injector pressure determined in step b); and d) opening the injector for the opening time at the opening instant calculated in step c).

2. The method according to claim 1, which further comprises using at least one of at least one opening period or at least one closing period of the injector as the operating parameter in step a).

3. The method according to claim 1, which further comprises specifying the opening instant and a closing instant to ensure that no pressure fluctuation initiated by the pump reaches the injector during an opening time between the opening instant and the closing instant.

4. The method according to claim 1, which further comprises taking at least one of the following properties of the metering device into account in step b):

at least one property of the delivery unit of the metering device;

at least one property of the pump of the metering device; or at least one property of the control unit configured to control the metering device.

5. The method according to claim 4, which further comprises taking an elasticity and a length of the line into account as the property of the metering device.

6. The method according to claim 5, which further comprises adapting the elasticity of the line, taken into account, at regular intervals in order to take ageing of the line into account.

7. The method according to claim 1, which further comprises carrying out at least the calculation of the injector pressure in step b) without feedback.

8. The method according to claim 1, which further comprises using at least one of the following further parameters in step c) for calculating the opening time:

a temperature of the reducing agent;

a viscosity of the reducing agent;

at least one physical property of the reducing agent;

at least one chemical property of the reducing agent; or a required amount of reducing agent.

9. The method according to claim 1, which further comprises taking at least one of the following parameters into account as a disturbing influence in step b):

a level of reducing agent in a reducing agent tank;

a temperature of the reducing agent;

a density of the reducing agent;

a viscosity of the reducing agent;

at least one physical property of the reducing agent;

at least one chemical property of the reducing agent; or a required amount of reducing agent.

10. A motor vehicle, comprising:

an internal combustion engine;

an exhaust gas treatment device for purifying exhaust gases from the internal combustion engine;

a metering device for metering a reducing agent into the exhaust gas treatment device; and a control unit configured to carry out the method according to claim 1.

* * * * *